United States Patent [19]

Hatta et al.

[11] Patent Number: 4,569,029

[45] Date of Patent: Feb. 4, 1986

[54] CHECK CALCULATOR

[75] Inventors: Koichi Hatta, Yamatokoriyama; Kenichiro Komeda, Gose, both of Japan

[73] Assignee: Sharp Kabushiki Kaisha, Osaka, Japan

[21] Appl. No.: 416,487

[22] Filed: Sep. 10, 1982

[30] Foreign Application Priority Data

Sep. 18, 1981 [JP] Japan ................. 56-149101
Sep. 30, 1981 [JP] Japan ................. 56-157156

[51] Int. Cl.$^4$ .................. G06F 7/38; G07G 7/48; G07G 15/20
[52] U.S. Cl. .................... 364/715; 364/406
[58] Field of Search ........... 364/705, 715, 408, 406; 235/58 CW

[56] References Cited

U.S. PATENT DOCUMENTS

| 3,920,979 | 10/1973 | Kilby et al. | 364/705 |
| 4,222,109 | 9/1980 | Siwula | 364/705 |
| 4,224,675 | 9/1980 | Pinkerman | 364/705 |
| 4,308,588 | 12/1981 | Siwula | 364/705 |

Primary Examiner—James D. Thomas
Assistant Examiner—Dale M. Shaw
Attorney, Agent, or Firm—Birch, Stewart, and Birch

[57] ABSTRACT

Disclosed is a check calculator as a preferred embodiment of the present invention, which is characterized in that;

It displays the amount of the check drawn on a payee and the deposit balance after the check has been drawn on a payee, then instructs either writing or reading of the number of the check drawn on a payee in response to specific operations of the keys provided, more particularly, when drawing a check on a payee, in responding to the reading operation of the reading key, the check calculator reads out the number of the check to be drawn next on a payee and also reads the deposit balance after the check has been drawn on a payee.

As a still further embodiment of the present invention, disclosed is a check calculator characterized in that;

It adds the input amount to the balance of the current account with the activated deposit key so that the input can be memorized as the new balance of the current account, then subtracts the input amount of the check drawn out from the deposit balance of the current account by operating the check key so that the result can be memorized as the new balance of the current account, and simultaneously, a digital number "1" is added to the check number memorized so that the result of this addition can be memorized as the new check number, and more particularly, the check calculator voids the deposit balance of the current account or amount of the check that is incorrectly input, by applying a very simple operation with the void key provided.

5 Claims, 16 Drawing Figures

CHECK CALCULATOR

BACKGROUND OF THE INVENTION

The present invention relates to a check calculator that memorizes and calculates the amount of the check and the deposit balance after the check has been drawn on a payee.

Furthermore, the present invention provides a check calculator that not only controls the deposit balance of the current account, but also the number of the check drawn on a payee, and voids the incorrect amount of either the deposit balance or the check drawn on a payee if erroneously input, by merely applying a very simple operation.

Conventionally, the prior art provides calculators such as the one having a check book balancing function that displays both the amount of the check and the deposit balance after the check has been drawn on a payee.

Although such a calculator properly controls both the amount of the check and the deposit balance after the check has been drawn on a payee, it appears however still defective due to the following reasons, i.e., it neither confirms what number of the check has just been drawn on a payee nor detects what number of the check will be drawn out next, and in addition, it cannot detect any illegal use of the check if committed by any third party without the knowledge of the bona fide holder himself nor confirm an accidental loss of the check. If lost, it will cause the operators to follow up annoying procedures before the check number can be correctly input when using the check next time.

Furthermore, such a calculator always involves an extremely complex operation in voiding the deposit balance or the amount drawn out by the check erroneously input.

OBJECTS AND SUMMARY OF THE INVENTION

The present invention eliminates such defects as described in the preceeding section by providing a check calculator that correctly reads (either by the display or print-out operation) the number of the check to be drawn on a payee next and the deposit balance after the check has been drawn out, i.e., the check calculator confirms that the check book has illegally been abused by any third party or has been lost by the bona fide holder himself, by means of correctly reading (either by the display or print-out operation) a maximum limit of the amount that can be drawn on by the next check, thus allowing the operators to eliminate the check number input operations whenever the checks are individually drawn on payees.

A still further object of the present invention is to provide a check calculator that voids either the deposit balance or the amount of the check incorrectly input, by merely applying a very simple operation.

Other objects and further scope of applicability of the present invention will become apparent from the detailed description given hereinafter. It should be understood, however, that the detailed description and specific examples, while indicating preferred embodiments of the present invention, are given by way of illustration only, since various changes and modifications within the spirit and scope of the invention will become apparent to those skilled in the art from this detailed description.

As a preferred embodiment of the present invention, the check calculator provides a device that displays the amount of the check and deposit balance after the check has been drawn on a payee, a keyboard incorporating keys that instruct either to write or read the check numbers, and another means that, in response to the reading operation performed by relevant keys, reads the number of the check to be drawn on next and the deposit balance after the check has been drawn on a payee.

A still further embodiment of the present invention provides a check calculator incorporating the following functions. When the deposit key is activated after the deposited amount has been input, said input amount is then added to the current account deposit balance being memorized so that the result from the addition will be memorized as the new current account deposit balance.

After the amount of the drawn check has been input, the input amount will be deducted from the current account deposit balance by operating the check key so that the result from the deduction will be memorized as the new current account deposit balance. At the same time, a digital number "1" is added to the check number being memorized so that the result from this addition will then be memorized as the new check number.

A void key is provided. If any amount is incorrectly input and the deposit key (or check key) pressed, the void key may be activated immediately after either the deposit or check key is entered.

After these operations are completed, the amount that was incorrectly input will be input again, then the void key followed by the deposit key (or check key) will be activated so that the incorrectly input amount will be subtracted from the current account deposit balance, and as a result, the check calculator will eventually memorize the result from the subtraction as the new current account deposit balance. (Alternatively, such an incorrectly input amount will be added to the current account deposit balance, enabling the check calculator to correctly memorize the result from the addition as the new current account deposit balance, and simultaneously, a digital number "1" will be subtracted from the check number so that the result from the subtraction will be memorized as the new check number.)

BRIEF DESCRIPTION OF THE INVENTION

The present invention will be better understood from the detailed description given hereinbelow and the accompanyimg drawings which are given by way of illustration only, and thus are not limitative of the present invention and wherein.

DETAILED DESCRIPTION OF THE INVENTION

In reference to FIGS. 1 through 5, a preferred embodiment of the present invention is described below.

Figures 1, 2, 3:
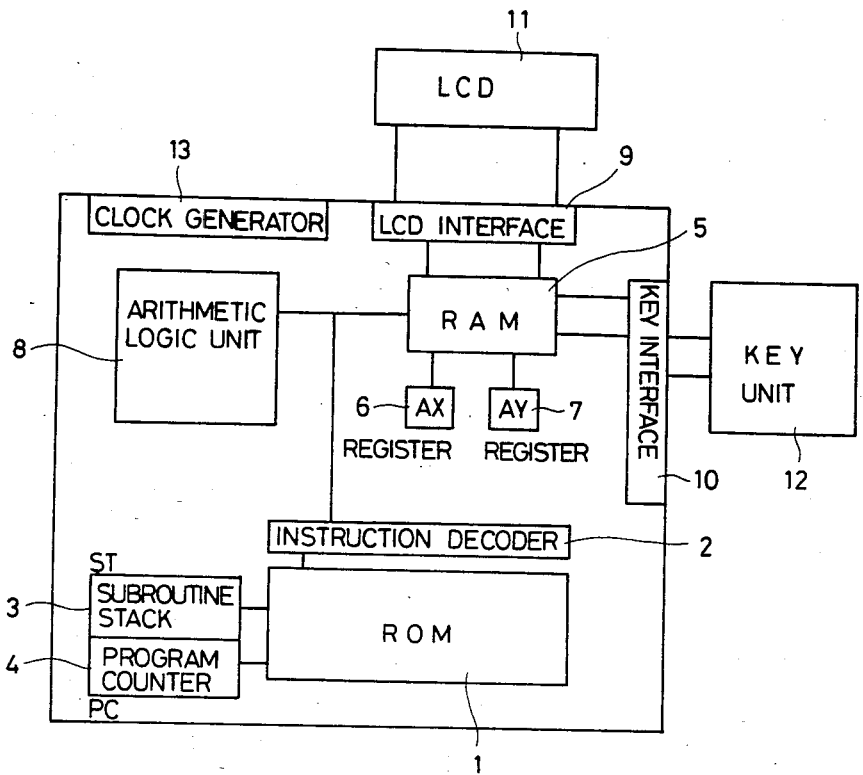
FIG. 1 shows a systematic block diagram of a check calculator as a preferred embodiment of the present invention.
FIG. 2 shows the position of RAM of the check calculator embodied in the present invention.
FIG. 3 shows the positions of the keys in the keyboard unit of the check calculator embodied in the present invention.

FIG. 1 shows a systematic block diagram of a preferred embodiment of the present invention, where the control device consists of read-only memory (ROM) 1, instruction decoder 2, subroutine stack 3, and program counter 4, whereas the memory device consists of random access memory (RAM) 5, register AX 6, and register AY 7.

Arithmetic logic unit 8 is connected to the LCD display device 11 and keyboard unit 12 through the RAM 5 and then through the interface 9 and key interface 10. The check calculator embodied in the present invention internally provides a clock generator 13 used for the power source and clock pulse circuit.

Both registers AX and AY connected to RAM 5 make up the data pointers designating the file number and digits of RAM 5. ROM 1 contains the control program of the connected equipment and executes various instructions sent from the instruction decoder 2. Subroutine stack 3 is necessary in performing any of the program operations. Program counter 4 performs counting operations for the program addresses. RAM 5 contains 7 registers, X, Y, Z, V, W, B and F, which are used for either memorizing data or implementing a temporary memory or flag during the arithmetic operation (Refer to FIG. 2).

Addresses in each register designate file numbers in register AX 6 and digits in register AY 7. Arithmetic device 8 executes a variety of arithmetic operations including addition, subtraction, multiplication and division in accordance with the relevant program stored in ROM 1.

FIG. 3 shows a layout of the keys provided in the keyboard unit 12 shown in the systematic block diagram of FIG. 1. Keys include the digital value display keys 0 through 9, arithmetic operation keys including +, −, ×, and ÷, and functional keys that implement specific requirements embodied in the present invention. Functional key features are described below.

Check number key (CK#)

This key inputs and calls for the check numbers. More particularly, if this key is activated after digital values are input, the check number will then be input, whereas if this key is activated without any of the digital values input, the check number will then be read out.

Note that the check number means the number of the check drawn out, which can be represented either by the digital value or by any of the alphabetical characters, or the number of the check that will be drawn on a payee next.

Deposit balance display key (BAL)

This key reads and displays the contents stored by the balance memory (deposit balance) in all circumstances.

Deposit key (DEP)

This key displays the total amount of the present deposit with any deposit newly added to the balance memory which memorizes the deposit balance.

Check key (CHK)

After a check has been drawn out, if the check amount is input in the check calculator, this key will then display the number of the check to be drawn out next and the deposit balance as well.

Figure 4:
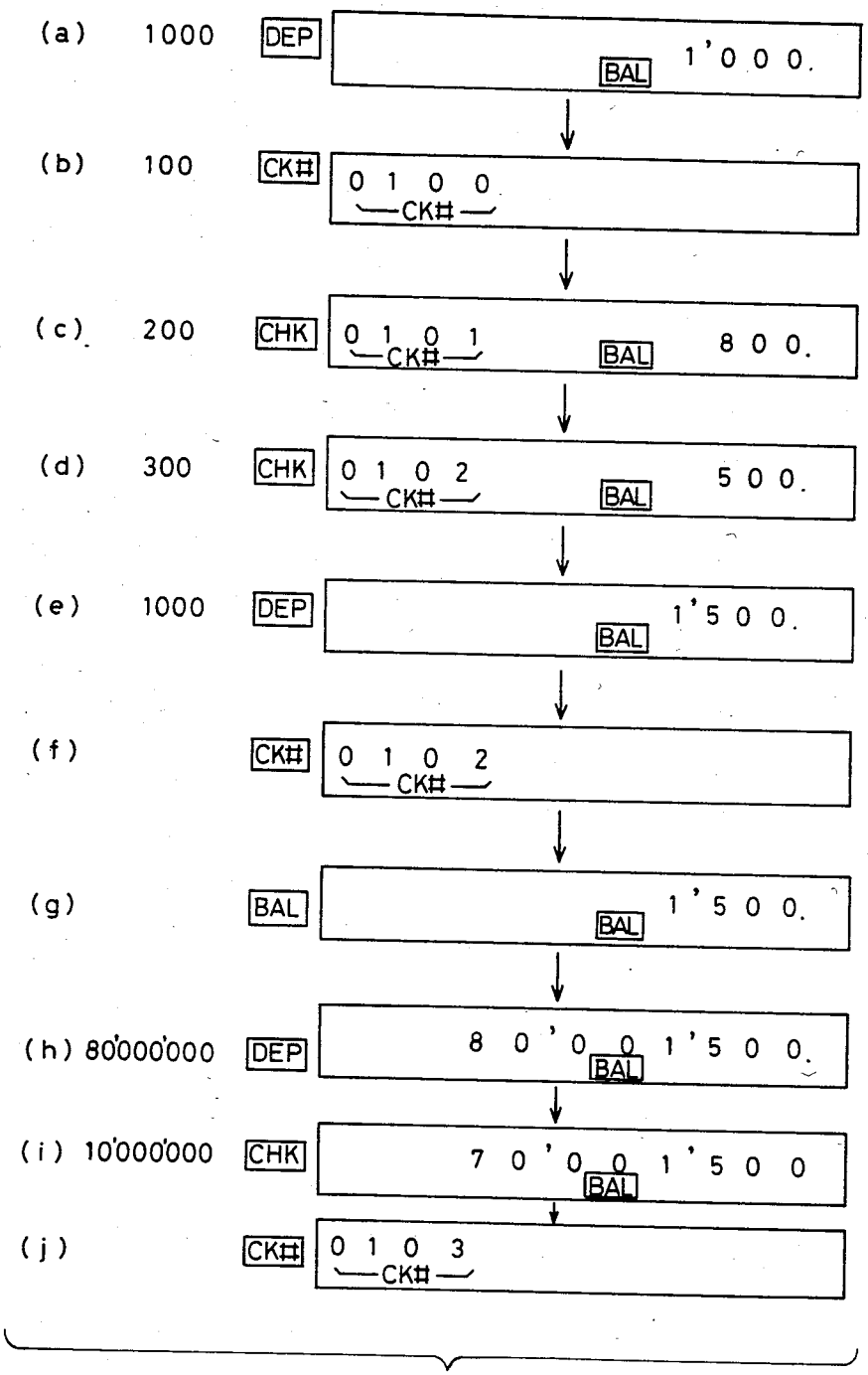
FIG. 4 shows an example of the display in the display unit in a preferred embodiment of the present invention.

In reference to FIG. 4, the LCD device 11 displays particular modes in response to the functional operations of these keys, as a preferred embodiment of the present invention.

Mode (a)

The LCD shows that a sum of ¥1,000.— has been deposited in a current account, in response to the operation of the "DEP" key.

Mode (b)

The LCD shows that a check bearing the foremost number in the check book in the hands of the bona fide holder himself has been input, in response to the operation of the "CK#" key.

Mode (c)

If a sum of ¥200.— is drawn out by a check, the LCD will then display that the remaining amount, being a maximum of ¥800.— is available for withdrawal by the check bearing the next number No. 101, in response to the operation of the "CHK" key.

Mode (d)

If a sum of ¥300.— is then drawn out by a check, the LCD will display that the remaining amount, being a maximum of ¥500.— can be withdrawn by the check bearing the next number No. 102, in response to the operation of the "CHK" key.

In a preferred embodiment of the present invention, if the mode (c) shifts to mode (d), the number of the check will automatically be counted up by one by the "CHK" key, thus eliminating an operation otherwise needed to input the individual number of the check before being drawn on a payee.

Mode (e)

The LCD shows that a sum of ¥1,000.— has been deposited in the current account, in response to the operation of the "DEP" key. Then, the deposit balance aggregates ¥1,500.—.

Mode (f)

The LCD shows that the "CK#" key outputs the number of the check to be drawn out next.

Mode (g)

The LCD shows that the "BAL" key outputs the deposit balance in the current account in the bank.

Modes (h) through (j)

After the check has eventually been drawn on a payee, the LCD will display the deposit balance in more than 7 display positions, and then the symbol "CK#" will automatically be erased, leaving only the balance memory (deposit balance) in display. Then, the contents of the check number stored in the check calculator will automatically be counted by one, thus making up the next check number to be

Next, in reference to the flow charts respectively shown in FIGS. 1 and 2 and FIGS. 5 through 8, and in relation to the key operations performed by keys Ck#, BAL, DEP, and CHK, functional operations of the check calculator are described below.

(I) "Ck#" key operation

Figure 5:
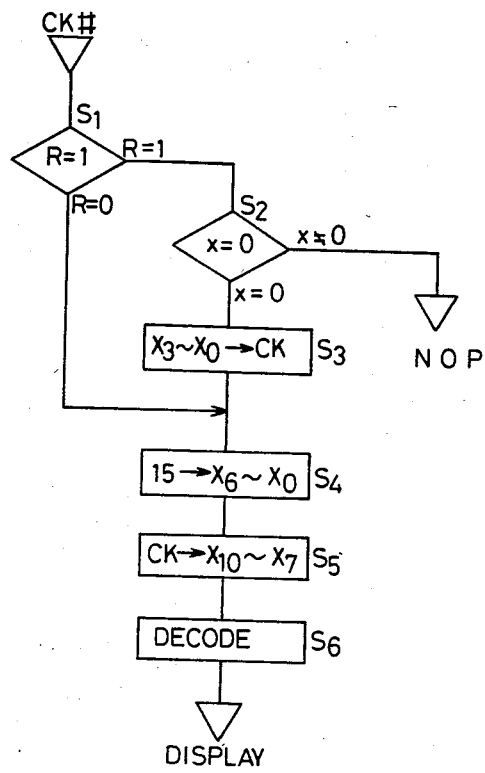
FIG. 5 through FIG. 8 show flow charts describing the operations performed by functional devices of the check calculator embodied in the present invention.

This key sets and calls for the check numbers. Refer to FIG. 5.

"Calling" will be executed by operating the "CK#" key when either an arithmetic operation is being performed or as soon as the result from the arithmetic calculation is obtained. "Setting" will be executed by operating the "CK#" key after the digital values are input.

As shown in FIG. 5, the "Ck#" key first judges (S1) if the check number has already been input, or if the check calculator still performs the arithmetic operation, or if the result from the arithmetic operation has already been determined.

If the digital value remains R=1, it indicates that the check calculator has already set values needed for the check numbers. If the digital value remains R=0, it means that the arithmetic operation is still being performed or the result has been determined. Note that R represents the RAM flag.

The "CK#" key activates either calling or setting of the check numbers only when the digital value remains R=1. During this process, in responding to the contents of register X that still memorizes the contents of the value set, the "CK#" key identifies if the decimal position is at the first digital position (X=0) or not (S2). If it isn't, the NOP mode will be activated.

In other words, when the decimal position still remains in the first digital position (X=0), X3 through X0 (digital values that run up to the 4th digital position) will be transmitted to the check number memory register CK (S3).

A blank signal "15" is then transmitted up to the 7th digital position (X6 through X0) (S4) of said register X. The CK contents, i.e., the value of the check number, will be transmitted to the 8th through 11th (X10 through X7) (S4). Then, the check number value will be displayed (S6) through the decoder. The display modes are as shown in FIGS. 4(a) and 4(b) or FIG. 4(f).

(II) "BAL" key operation

Figure 6:
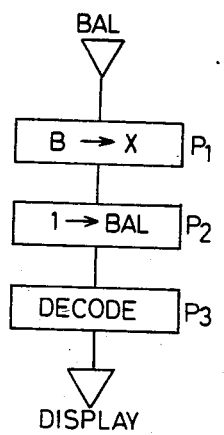

This key calls for and displays the contents of the balance memory. Refer to FIG. 6.

When the "BAL" key is activated, the contents of register B that still memorizes the contents of the balance memory will be transmitted to register X (P1). Then, in order to process the symbol "BAL" that illuminates itself while the balance memory is being displayed, flag BAL (P2) will be set, which will then be displayed by means of the display elements through the decoder (P3).

(III) "DEP" key operation

Figure 7:
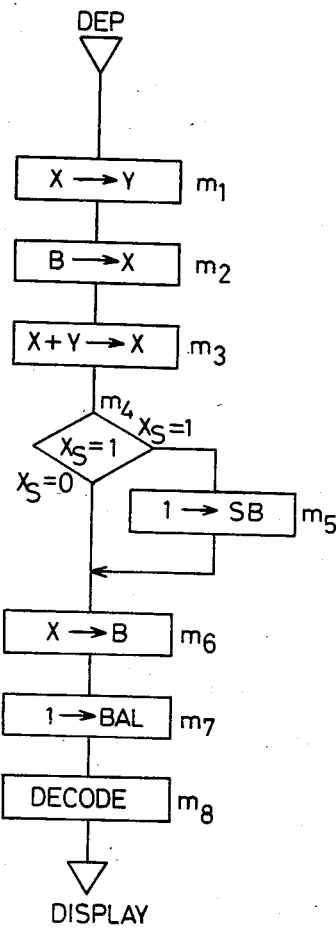

This key adds the input amount to the balance memory (Refer to FIG. 7).

In FIG. 7, the contents of register X memorizing the input amount will be transmitted to register Y (m1). The contents of register B memorizing the balance memory contents will then be transmitted to register X (m2). After completing a process X+Y→X (m3), the added contents of the balance memory will be obtained.

After these procedures are completed, the digital value $X_s=1$ will be detected (m4) so that the contents of register X can be determined whether being positive or negative. If the digital value is X=0, the balance memory contains the positive value, and if the digital value is $X_s=1$, the balance memory contains the negative value. If the balance memory contains the negative value, flag SB that flashes the symbol "BAL" will be set (m5).

The new balance memory contents produced by a process, X+Y—X, will be transmitted to register B from register X (m6), and register B will store the new balance memory contents.

After these procedures are completed, flag "BAL" is then activated so that the symbol "BAL" can be illuminated, which will then be illuminated by the display elements through the decoder.

(IV) "CHK" key operation

Figure 8:
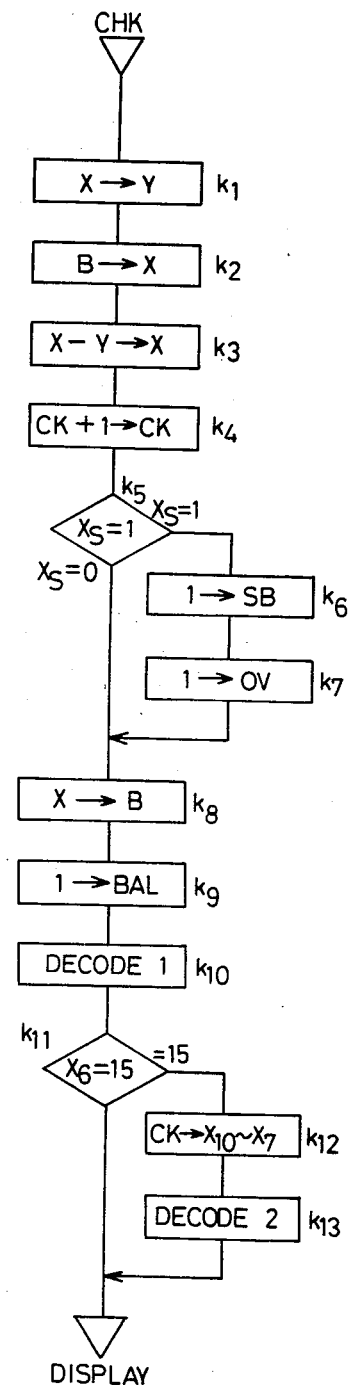

This key subtracts the input amount from the balance memory (Refer to FIG. 8).

First, the contents of register X that memorizes the input amount will be transmitted to register Y and (K1). Then, the contents of register B that memorizes the contents of the balance memory will be transmitted to register X (K2).

The contents of the balance memory that are subtracted by a process X−Y→X, will then be obtained. A process "CK+1→CK" is then executed in order to count up the check number. After these procedures are completed, the digital value $X_s=1$ will be detected in order to enable the CHK key to judge the new contents of the balance memory whether being the positive value or the negative. (K5)

If the digital value is $X_s=0$, the balance memory will then be in the positive value, whereas if the digital value is $X_s=1$, the balance memory will be in the negative value.

If the balance memory remains in the negative value, symbol BAL that flashes SB will be set (K6) and symbol "OVERDRAWN" that illuminates flag 0V will also be set.

The new balance memory contents produced by a process X−Y→X will be transmitted to register B and then stored in it (K8).

After these procedures are completed, flag BAL will be set (K9) in order to illuminate symbol BAL, and then the contents of register X will be decoded (K10) by the decoder 1 for display.

Next, the CK key identifies whether the 7th digit X 6 of the decoded register X is the blank symbol 15 or not (K11). If the digit mode is X6=15, a process CK X10 through X7 will be executed (K12) so that the check number can be displayed only when the new balance memory contents remain in less than 6 display positions, thus only the check number can be decoded (K13) by passage through the decoder 2. The check number will be displayed by means of the display elements.

A still further embodiment of the present invention is described below.

As with the preceding embodiment described above, FIG. 1 shows a systematic block diagram of the check calculator embodied in the present invention. As a still further embodiment of the present invention, another check calculator is provided with the check number key, deposit balance display key, deposit key, check key, and the void key that voids either the input amount or check number shown in FIG. 3.

With the void key thus provided, the following functions are added to those original key functions given to the first embodiment of the check calculator specified in the preceding description.

VOID key (VOID)

The void key is used when either the deposited amount or the check amount has been incorrectly input.

If the void key is activated immediately after either the deposit key (or check key) is activated in order to input an incorrect amount, then the incorrectly input amount will be called up by the display register. At the same time, the void key enables the check calculator to enter the void mode. After these procedures are completed, if the void key is operated after the incorrectly input amount has been input again, the void key will function so that the check calculator will still remain the void mode.

Deposit key (DEP)

With the void key activated, when the check calculator enters the void mode immediately after the activation of the void key, the deposit key will then start to function so that the amount memorized by the display register can be subtracted from the deposit balance and the result will be memorized by this register as the new deposit balance which is then displayed by this register as the correct amount.

Check key (CHK)

When the check calculator enters the void mode with the void key activated, the check key will then start to function so that the amount memorized by the display register can be added to the deposit balance and the result will be memorized by this register as the new deposit balance, then simultaneously, the check number will be counted down by "1", thus enabling the display register to display the corrected deposit balance and check number after the count-down operation has been done.

FIGS. 9 through 13 show typical examples of a variety of the key operations and display performances as preferred embodiments of the present invention.

Figure 14:
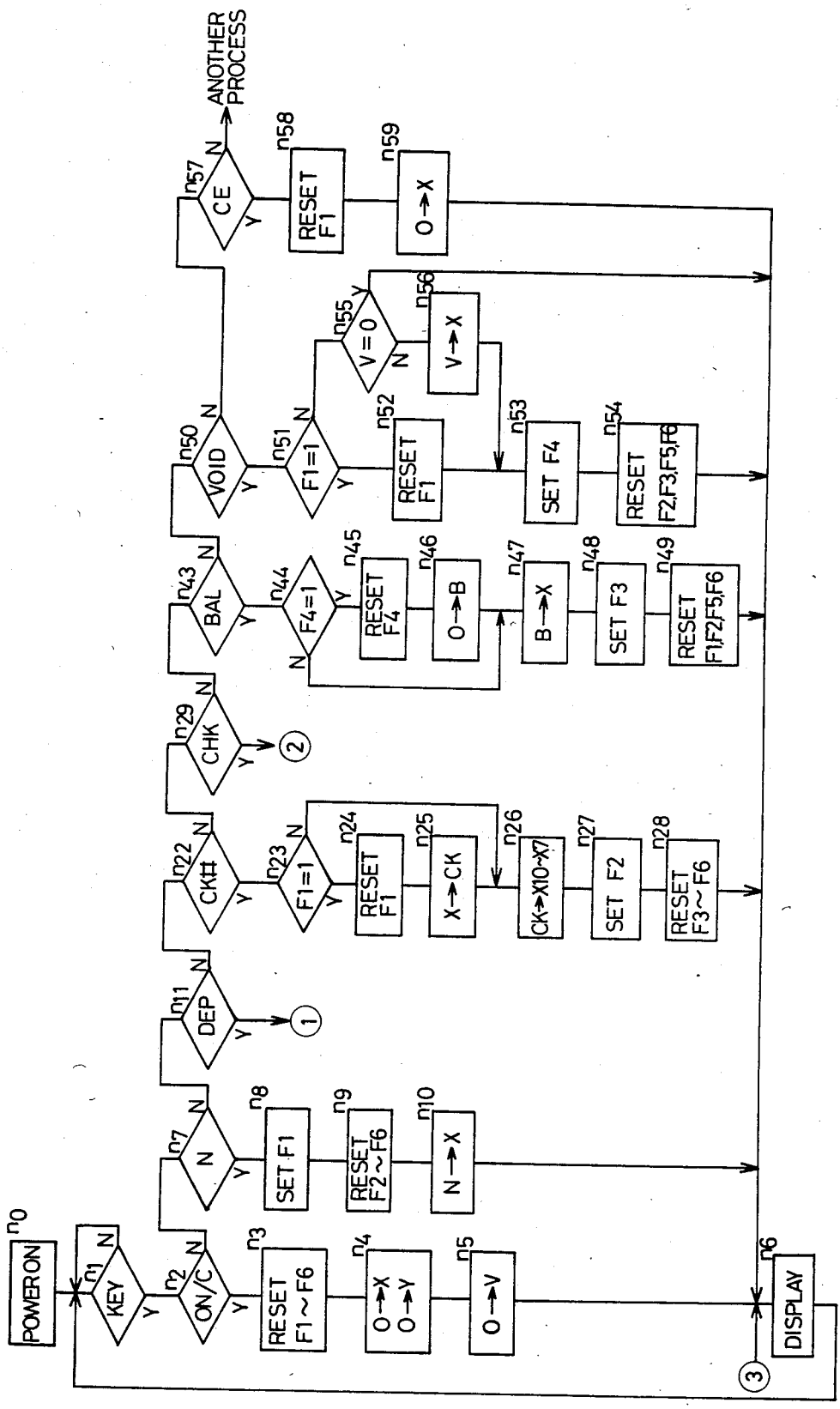
FIG. 14 through FIG. 16 show flow charts describing the program contents in a further embodiment of the present invention.
Figures 15, 16:
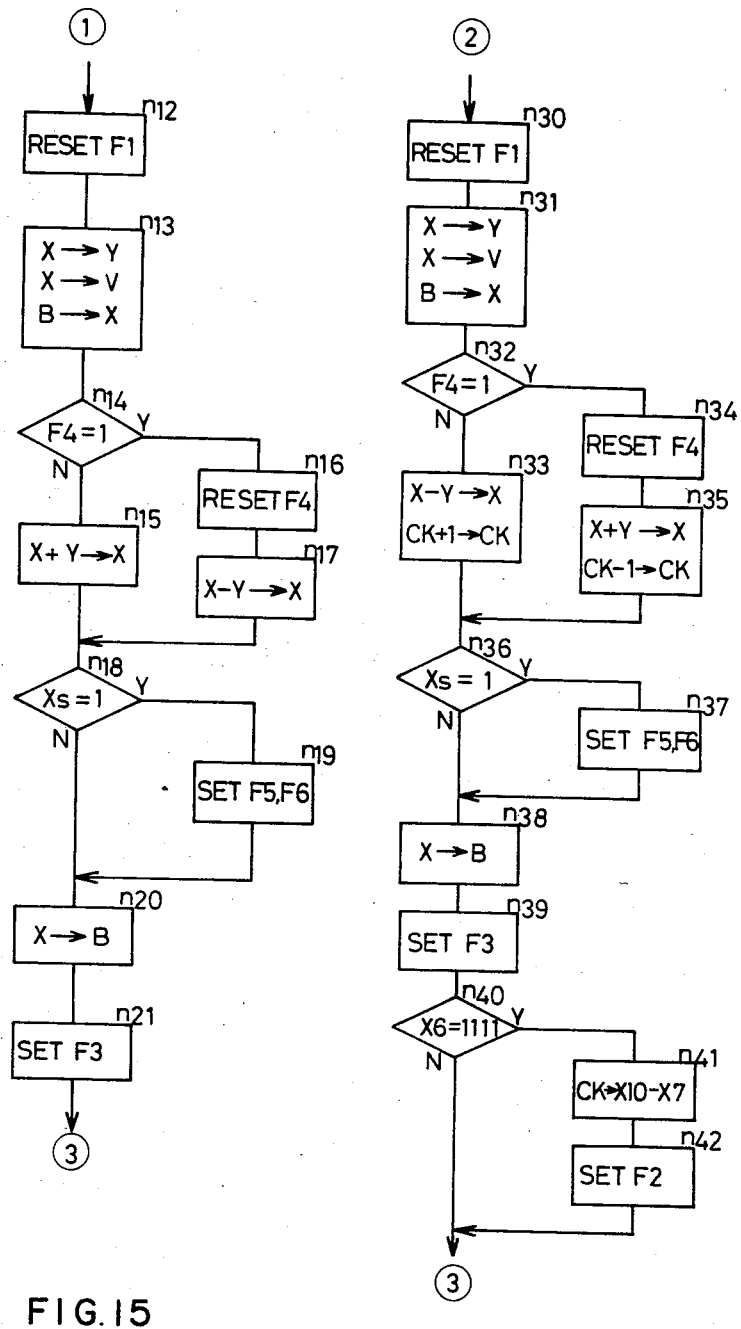

FIGS. 14 through 16 show the flow charts describing the contents of the programs memorized by ROM 1.

In FIGS. 14 through 16, X (11 display positions) represents the display register, Y and V represent the arithmetic register, B represents the deposit balance memory register, and CK (4 display positions) represents the check number memory register.

Note that the memory contents in B and CK remain without being erased even when the power turns OFF.

F1 represents a flag which shows that the numerical (N) keys are being operated immediately before the display is performed.

F2 represents a flag which shows that symbol 'CK#' is being displayed below the check number display position of the display device.

F3 represents a flag which shows that symbol "BAL" is being displayed while the deposit balance display is performed by the display device.

F4 represents a flag which shows that symbol "VOID" which is indicative of the void mode and state of being in the void mode, is being displayed in the display device.

F5 represents a flag which shows that symbol "OVERDRAWN" is being displayed in the display device when the deposit balance is overdrawn.

F6 represents a flag which shows that symbol "BAL" flashes in the display device when the deposit balance is overdrawn.

All the registers and flags are provided in RAM 5 shown in FIG. 1.

Functional features in reference to FIGS. 9 through 13 are described below.

Figure 9:
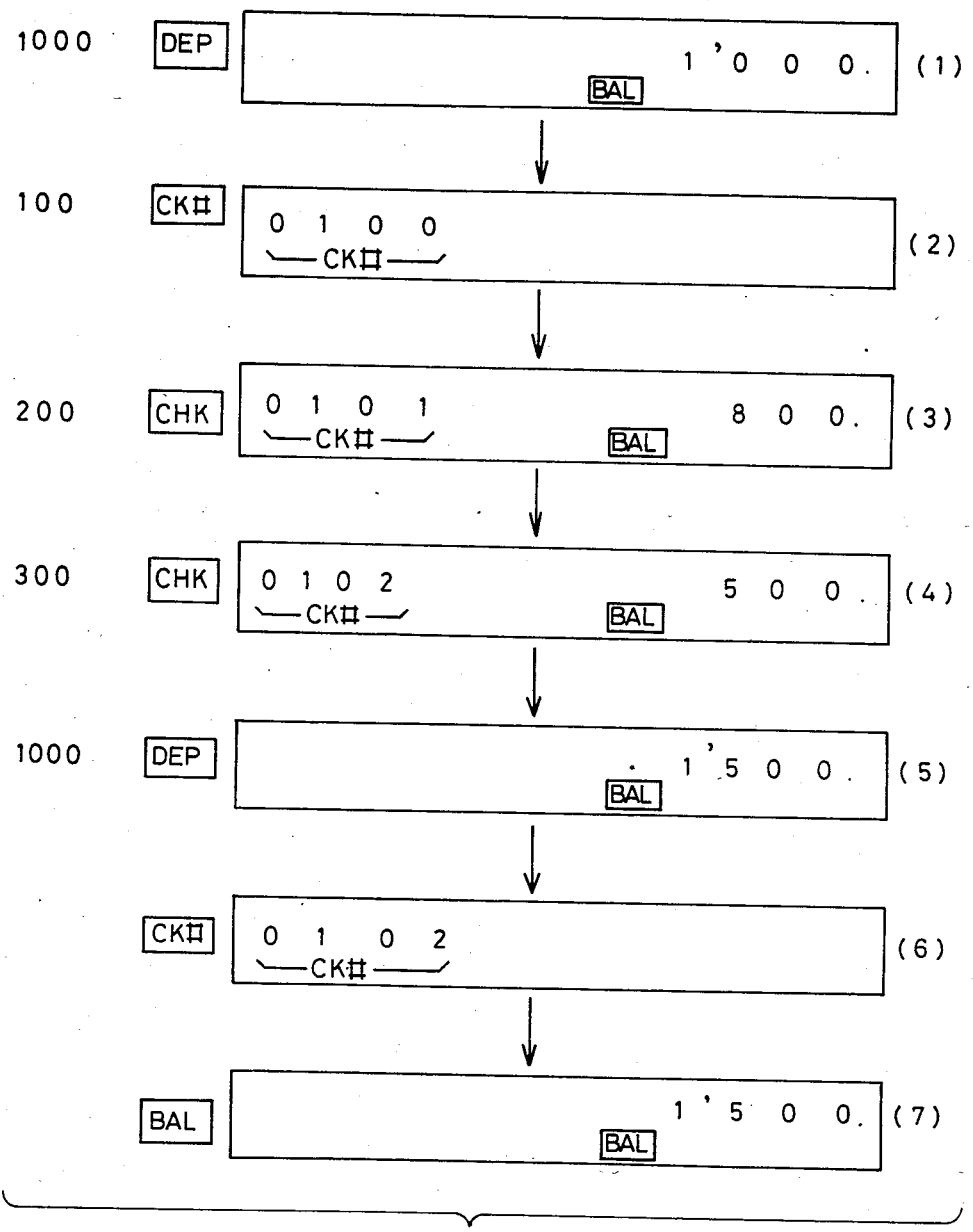
FIG. 9 through FIG. 13 show examples of the key operations in another embodiment of the present invention.

FIG. 9 (1) Deposit amount input

When a sum of ¥1,000.— is deposited in a current account, the same amount is input into the check calculator.

As a result, the deposited amount is added to the deposit balance (assuming that the balance is zero in this case), then the check calculator memorizes the result of this addition as the new deposit balance, while this result is displayed in the display positions of the check calculator. Simultaneously, symbol "BAL" is also displayed, showing that the digital values being displayed are actually the deposit balance.

When the numerical keys are operated, digital values are sequentially transmitted to the display register X, which are then displayed in the display device. Sequential shifts of the digital values are shown in the order of

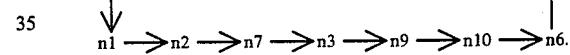

If the deposit key is activated after a specific deposit amount is input to register X, then the digital values will sequentially proceed in the order of n1→n2→n7→n11→n12→n13→n14→n15→n18→n20→n21→n6, thus enabling the check calculator to perform those sequential processes described earlier in this section.

n18 itself contains the digital value factor "X=1", by which the numerical value (deposit balance) memorized by the display register X can be determined to be positive or negative.

If it is found to be the negative (when $X_s=1$), flags F5 and F6 will be set so that symbol "OVERDRAWN" will be displayed in the display device and symbol "BAL" will start to flash.

FIG. 9 (2) Setting the check number

First, a check number to be drawn on a payee is determined. When the check number key is activated after the determined check number has been input, the digital values then sequentially proceed in the order of n1→---→n22→n23→n24→n25→n26→n27→n28→n6.

As a result, the check number activated by the check number key is then transmitted to the check number register CK, and simultaneously, the input check number will be displayed together with symbol 'CK#' in the display device.

FIG. 9 (3) and (4) Entry of the check amount drawn out

When drawing a check on a payee, the check amount is input in the check calculator. In other words, after the check amount is input, the check key is entered, then activates the digital values which then sequentially proceed in the order of n1-→n29→n30→n31→n32→n33→n36→n38→n39→n40-→n41→n42-n6.

As a result, the actual deposit balance and the check number that will be drawn on the next payee are displayed together in the display device.

n40 is checked in order to see if the contents in the display position (X6), being the 7th from the rearmost display position, contain blank codes ("1111") or not, i.e., it determines whether the number of the display positions displaying the deposit balance memorized by the display register X is less than 6 of the display positions or not.

Depending on the result determined, and only when the number of the display positions displaying the deposit balance is less than 6, the check number will be displayed.

If the number of the display positions displaying the deposit balance is more than 7, the check number will not be displayed at all. Note that the check number contents will automatically be counted up by one in the check calculator.

FIG. 9 (5) Entry of the deposit amount, and (6) Call for the check number

If the check number key is activated without having any of the numerical values being input, the digital value will then sequentially proceed in the order of n1-→---→n22→n23→n26→n27→n28→n6. As a result, the check number key calls for a check number (which will be drawn on the next payee) and this check number will then be displayed together with symbol "CK#".

FIG. 9 (7) Call for the deposit balance

If the deposit balance display key is activated, the digital values will sequentially proceed in the order of n1-→---→n43→n44→n47→n48→n49→n6. As a result, the deposit balance will be called for, which will then be displayed in the display device together with symbol "BAL".

Figure 10:
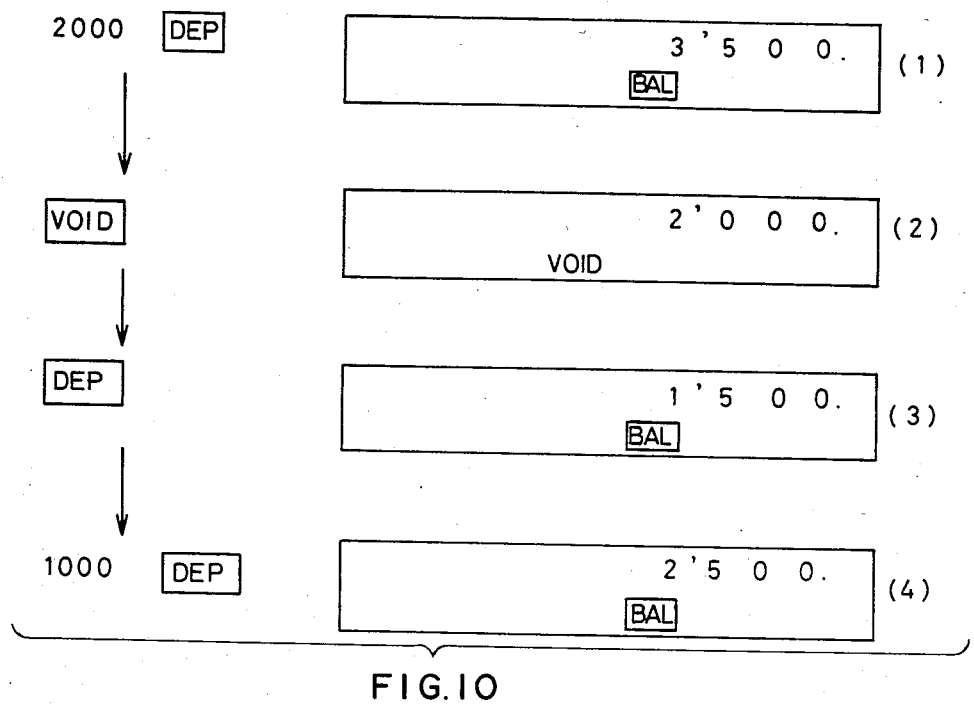

Functional features shown in FIG. 10 are described below.

FIG. 10 shows how the check calculator will operate in order to void the deposited amount when incorrectly input.

FIG. 10 (1) When the deposited amount is incorrectly input.

Assume that the deposit balance should have actually aggregated ¥2,500.— by addition of a new deposit or ¥1,000.—, but the operator added a sum of ¥2,000.— to the deposit balance by mistake.

FIG. 10 (2) Function of the void key

When the void key is activated, digital values will sequentially proceed in the order of n1-→---→n50→n51→n55→n56→n53→n54→n6. As a result, the erroneously input amount being memorized by the arithmetic register V will be called for by the display register X, then said amount will be displayed together with symbol "VOID" which itself indicates that the void mode is entered by the check calculator.

FIG. 10 (3) Function of the deposit key

When the deposit key is activated, digital values will sequentially proceed in the order of n1-→---→n11→n12→n13→n14→n16→n17→n18→n20→n21-→n6.

As a result, the deposit balance will return to the original position free from the amount incorrectly added, and simultaneously, the actual deposit balance will be displayed correctly.

FIG. 10 (4) shows a normal condition where a new deposit is correctly input.

Figure 11:
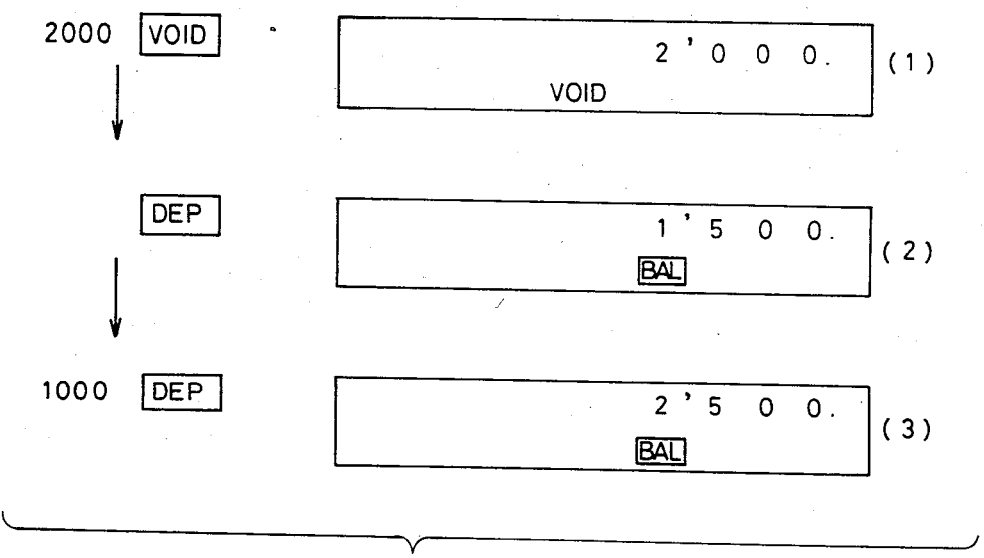

Functional features shown in FIG. 11 are described below.

FIG. 11 shows that the void function is being performed in order to cancel all the calculations unconsciously made until the operator eventually realized that the deposit by a sum of ¥2,000.— was erroneously input instead of ¥1,000.— which was to be deposited.

FIG. 11 (1) Reentry of the incorrectly input amount and the function of the void key First, the incorrectly input amount is again input in the check calculator, then the void key is activated. So, the digital values sequentially proceed in the order of n1-→---→n50→n51→n52→n53→n54→n6. As a result, the check calculator enters the void mode, and simultaneously, symbol "VOID" is displayed.

FIG. 11 (2) Function of the deposit key

When the deposit key is activated, digital values then sequentially proceed in the order of n1-→---→n11→n12→n13→n14→n16→n17→n18→n20→n21-→n6. As a result, the incorrectly input amount is deducted from the deposit balance.

FIG. 11 (3) The deposit amount is correctly input

In order to void the incorrectly input amount and input a correct amount, 1000, VOID, and DEP keys are effective if operated in this order.

Figure 12:
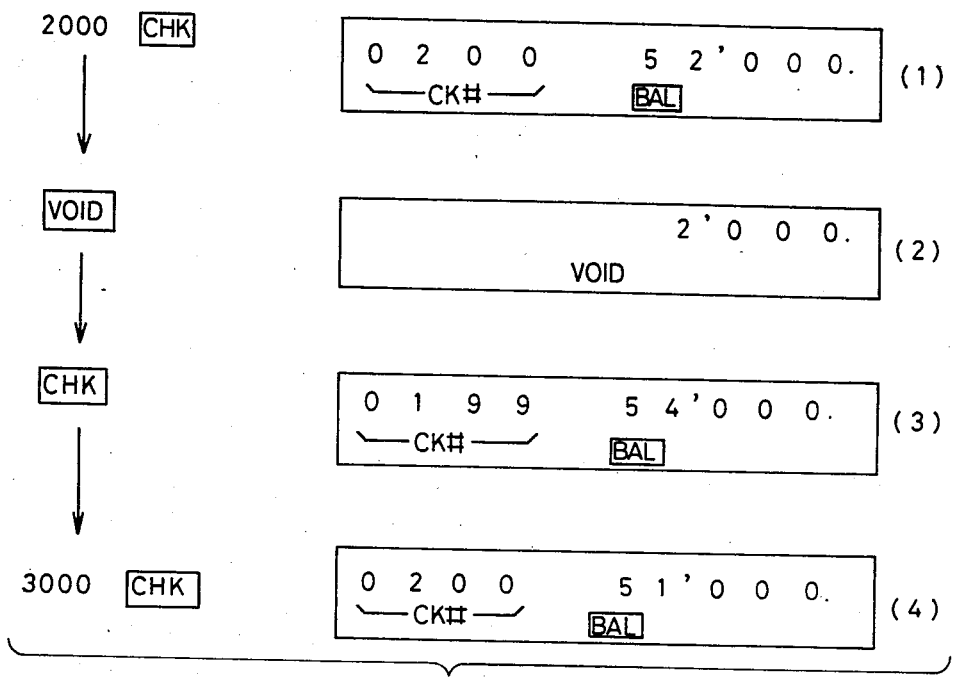

Functional features shown in FIG. 12 are described below.

FIG. 12 shows how the incorrectly input check amount can be voided.

FIG. 12 (1) Check amount is incorrectly input

Assume that the deposit balance in the current account should have actually aggregated ¥51,000.— by addition of a new deposit by ¥3,000,—, but the operator added a sum of ¥2,000.— to the current account deposit by mistake.

FIG. 12 (2) Function of the void key

When the void key is operated, digital values then sequentially proceed in the order of n1-→---→n50→n51→n55→n56→n53→n54→n6. As a result, the incorrectly input amount memorized by the arithmetic register V is then called for by the display register X, which is then displayed in the display device together with symbol "VOID" which itself indicates to have the void mode to remain.

FIG. 12 (3) Function of the check key

When the check key is operated, digital values will sequentially proceed in the order of n1-→---→n29→n30→n31→n32→n34→n35→n36→n33→n39-→n40→n41→n42→n6.

As a result, the check calculator returns to the original state free from any of the incorrectly input amounts in the deposit balance, and thus, the actual deposit balance and check number can be displayed correctly.

FIG. 12 (4) shows that the check amount has been correctly input.

Figure 13:
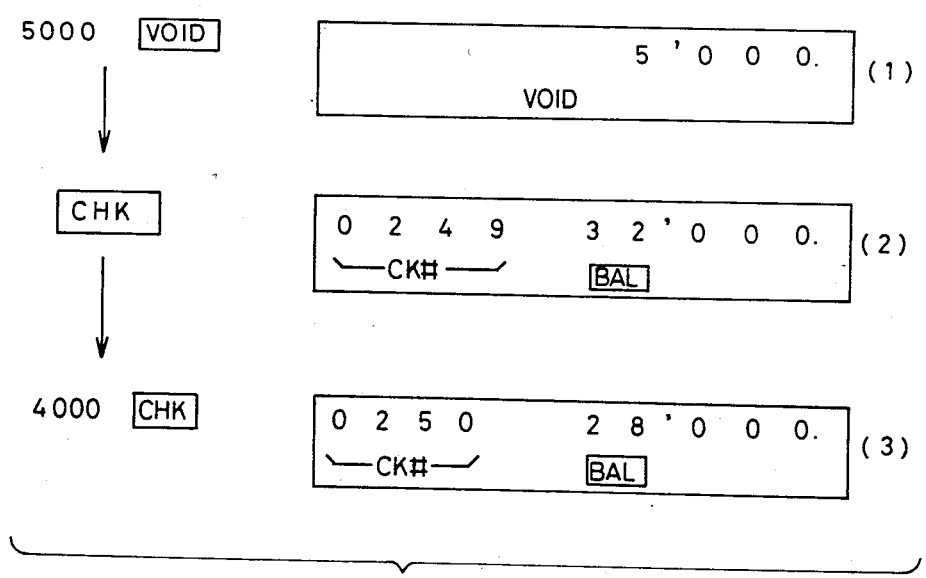

FIG. 13 shows that the void operation is being performed in order to cancel all the calculations unconsciously followed up until the operator eventually realized that a sum of ¥5,000.— was erroneously input instead of ¥4,000.— which was the actual amount of the check received.

FIG. 13 (1) Re-input of the check amount incorrectly input, and the void key operation After the incorrectly input amount has been input over again, the void key will be activated. Then, the digital values will sequentially proceed in the order of n1→--→n50→n51→n52→n53→n54→n6. As a result, the check calculator enters the void mode, and simultaneously, symbol "VOID" will be displayed in the display device, indicating that the "VOID" mode now governs the check calculator.

FIG. 13 (2) Function of the check key

When the check key is operated, digital values will sequentially proceed in the order of n1→--→n29→n30→n31→n32→n34→n35→n36→n38→n39-→n40→n41→n42→n6.

As a result, the incorrectly input amount of the check will be added to the deposit balance, and the check number will be counted down by "1".

FIG. 13 (3) The check amount has been correctly input

Since the check amount has been correctly input, the deposit balance remains in the correct amount.

In order to clear the deposit balance memory, the power on/clear key is activated first, followed by sequential activation of the numerical keys, void keys, and deposit balance display key.

Consequently, the deposit balance memory key will be cleared in the n48 digital position. The state of clearance will be indicated by display "BAL 0".

The invention being thus described, it will be obvious that the same may be varied in many ways. Such variations are not regarded as a departure from the spirit and scope of the invention, and all such modifications are intended to be included within the scope of the following claims.

What is claimed is:

1. A check calculator comprising:
   memory means for storing deposit balance information and check number information;
   input means for instructing either a read or write operation of a check number drawn on a payee, said input means including a withdrawal key for inputting withdrawal amounts into said calculator and a deposit key for inputting deposit amounts into said calculator;
   read or write operation means for reading the contents of the memory means in said read operation and for storing input information in the memory means in said write operation;
   display means for displaying the inputted withdrawal amount and the remaining deposit balance after said inputted withdrawal amount has been drawn on a payee;
   said remaining deposit balance being generated in response to an actuation of said withdrawal key upon inputting said withdrawal amount;
   means for reading, in response to said read instruction, performed by said input means in drawing an amount on a payee, the number of the next check to be drawn on a payee and the deposit balance remaining on which the next numbered check may be drawn on a payee; and
   means for automatically incrementing the next numbered check in response to the actuation of the withdrawal key following the inputted withdrawal amount to be drawn on a payee.

2. A check calculator according to claim 1 further including means for memorizing a new deposit balance upon actuation of an input amount followed the actuation of said deposit key.

3. A check calculator according to claim 1 further including void key means for retrieving an original deposit balance, whereby an incorrectly input monetary amount followed by the actuation of a series of deposit or withdrawal keys may be immediately erased upon actuation of said void key followed by actuation of the deposit or withdrawal key, followed by another void key actuation, followed by a reinsertion of the correctly input monetary amount, thereby retrieving the original correctly input current deposit balance.

4. A check calculator according to claim 3 wherein the actuation of said void key also automatically increments or decrements the check number to be drawn on the next payee if necessary.

5. A check calculator according to claim 1 wherein the actuation of said void key immediately after an erroneous key input will void that key input.

* * * * *